April 3, 1962 C. W. LUNDGREN ET AL 3,028,283
METHOD OF MAKING GOLF CLUB GRIP
Filed March 14, 1956 2 Sheets-Sheet 1
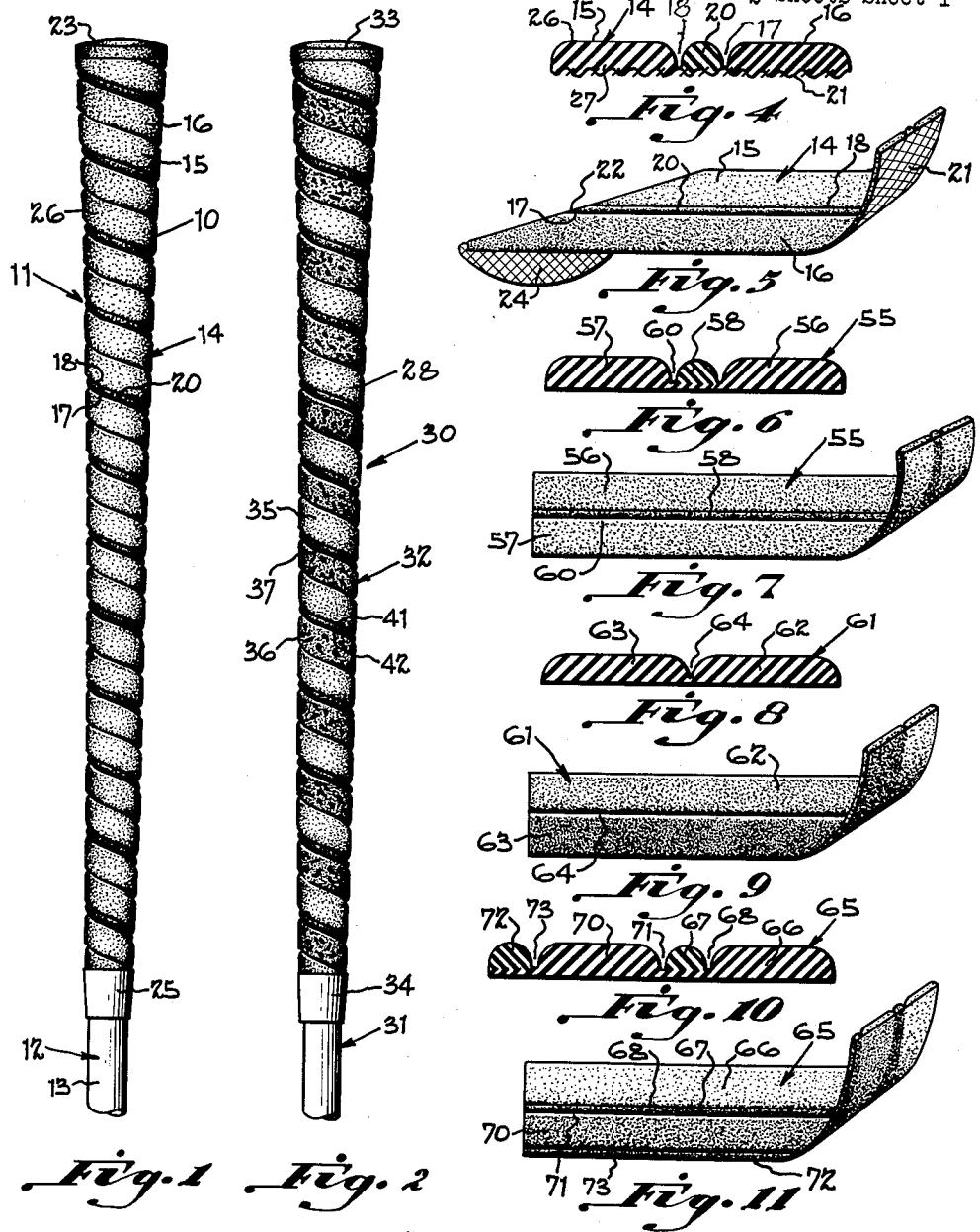
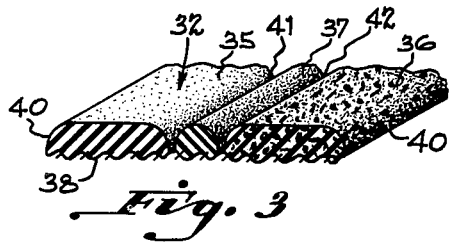
INVENTORS.
Carl W. Lundgren.
BY Ervin F. Nutter.
Wood, Herron & Evans.
ATTORNEYS.

INVENTORS.
Carl W. Lundgren.
BY Erwin F. Nutter.
Wood, Herron & Evans,
ATTORNEYS.

3,028,283
METHOD OF MAKING GOLF CLUB GRIP
Carl W. Lundgren and Ervin F. Nutter, Cincinnati, Ohio, assignors to MacGregor Sport Products, Inc., Cincinnati, Ohio, a corporation of Ohio
Filed Mar. 14, 1956, Ser. No. 571,512
7 Claims. (Cl. 156—225)

The present invention relates to golf club grips, and is particularly directed to a warp-around griup of the type in which a strip is spirally wrapped around the handle of a club, as distinguished from a grip which is molded as a single cylindrical sleeve either directly on the club handle or on a separate mandrel from which the grip is transferred to a club handle.

One object of the present invention is to provide a grip which has an extremely attractive appearance and which will retain its attractiveness throughout the life of the club. In recent years appreciable attention has been placed upon the attractiveness of golf clubs as well as upon their playing qualities. For example, much emphasis has been placed upon the use of non-rusting materials in the shaft and club head; also, club heads have been provided with inserts and metallic coatings to create a two-tone effect. However, similar attempts to increase the attractiveness of club handles have not been entirely satisfactory. For example it has been proposed to provide a wrap-around grip having a painted stripe running along the channel separating adjacent bands of the strip. However, after relatively short periods of use this painted stripe tends to wear off so that much of the attractiveness of the grip is lost. The present invention is predicated upon the concept of providing a golf club grip formed by spirally winding upon a club handle a composite strip constituted by different colored component strips vulcanized together. Each of the component strips is formed of a rubber composition including a thoroughly intermixed coloring material effective to uniformly color the entire component strip. Since the coloring material is distributed throughout the grip, it can be used for indefinite periods without any change of coloring due to wear, abrasion, scuffing, or the like.

In the present composite strip, the different colored component strips are separated by a relatively deep channel which is effective to minimize the running of color from one strip into the other strip during the vulcanizing process. In addition, the channel effectively hides any slight running which does occur so that in the finished grip the line of demarcation between colors appears to be extremely regular making the grip very attractive.

Another object of the present invention is to provide a grip which forms a frictional surface on the handle of a club effective to give a player a firm hold upon the club under all conditions of play. In a preferred form of grip the composite strip is formed from two dissimilar component strips. One of the component strips is constituted by a homogeneous rubberlike material; while the other strip is formed from a material having a fabric such as cotton flock, shredded tire reinforcing cord or the like, impregnated therein. In the finished grip these component strips form alternate bands along the handle so that the player's hands contact several bands of each type of material. In dry weather plain rubber is considered by many players to give a superior frictional grip; however in wet weather and for use by players whose hands perspire heavily, fabric impregnated bands are considered to provide the best frictional hold. The present grip which comprises these two materials in alternate bands, thus affords a grip for every player in any type of weather which he might encounter.

The preferred embodiment of the present grip is also advantageous in that its configuration substantially improves the frictional "drag" of the handle. The preferred grip utilizes a composite strip in which the two component strips are separated by two deep grooves or channels and a bead disposed between the channels. When the grip is in place the bead and channels extend around the club handle providing a slightly irregular surface which materially adds to the frictional "drag" of the grip.

Another object of the present invention is to provide a grip having a substantial amount of tackiness which further improves a player's hold upon a club. In the past it has been proposed to coat rubber grips with a liquid agent effective to impart to the surface of the grip a tacky feeling for improving a player's grasp upon the club. However, this agent has a tendency to wear off and has not proven to be entirely satisfactory. It is a concept of the present invention to provide a grip having "built in tack"; that is a grip in which a tacky material is impregnated in the grip and extends all the way through the grip so that a grip remains tacky for indefinite periods. This is accomplished by mixing with the grip a quantity of resin and synthetic rubber compound which are not vulcanized, with the remainder of the grip.

The present method of constructing golf club grips contemplates the placing of cured unvulcanized component strips side by side in a mold having relatively deep channels to receive the strips and a divider flange extending intermediate each of the adjacent strips and effective to form a deep channel between the adjacent strips when heat and pressure are applied to the mold to vulcanize the adjacent strips into a single composite strip.

In making a preferred form of grip a cloth backing strip is placed in the mold over the unvulcanized component strips. This fabric is preferably cut so that its threads extend diagonally, giving the material a limited amount of stretch. When pressure is applied to the mold, the divider flange is brought into close proximity with the cloth strip inhibiting flow from one component strip to the other, so that an optimum separation between the different colored rubber component strips is secured.

The fabric backing layer, in addition to providing good color separation also gives strength and stability to the grip. Furthermore, the use of a diagonally cut fabric backing material is extremely advantageous when the grip is wound upon the club.

In the present method of manufacturing grips, after the composite strip has been formed, the club handle is prepared in any suitable manner for receiving the grip, such as by placing a tapered rubber sleeve and paper liner thereon; these members are then coated with a suitable rubber adhering adhesive. Next, one end of the elongated composite strip is permanently secured to the handle by means of staples, or the like, and the handle is turned on a lathe while the grip is stretched by hand as it is helically wound about the handle. The fabric backing limits the amount that the composite strip can be stretched so that a uniform tension is applied to all portions of the grip. This uniform tension is highly desirable since it provides a grip having a uniform "feel" to a player's hands.

These and other objects and advantages of the present invention will be more readily apparent from a further consideration of the following detailed description of the drawings illustrating a preferred embodiment of the invention.

In the drawings:

FIGURE 1 is an elevational view of a golf club handle fitted with a grip constructed in accordance with the present invention.

FIGURE 2 is a view similar to FIGURE 1 showing a modified form of grip.

FIGURE 3 is a combination perspective, cross sectional view of the composite strip used to form the grip of FIGURE 2.

FIGURE 4 is a transverse cross sectional view of the composite strip used to form the grip shown in FIGURE 1.

FIGURE 5 is a top plan view of the strip shown in FIGURE 1, the strip being partially turned back to show details of its construction.

FIGURE 6 is a transverse cross sectional view of a modified form of composite strip.

FIGURE 7 is a top elevational view, similar to FIGURE 5, of the strip shown in FIGURE 6.

FIGURE 8 is a transverse cross sectional view of another modified form of composite strip.

FIGURE 9 is a top plan view, similar to FIGURE 5, of the composite strip shown in FIGURE 8.

FIGURE 10 is a transverse cross sectional view of a further modified form of composite strip.

FIGURE 11 is a top elevational view similar to FIGURE 5 of the strip shown in FIGURE 10.

Figure 12:
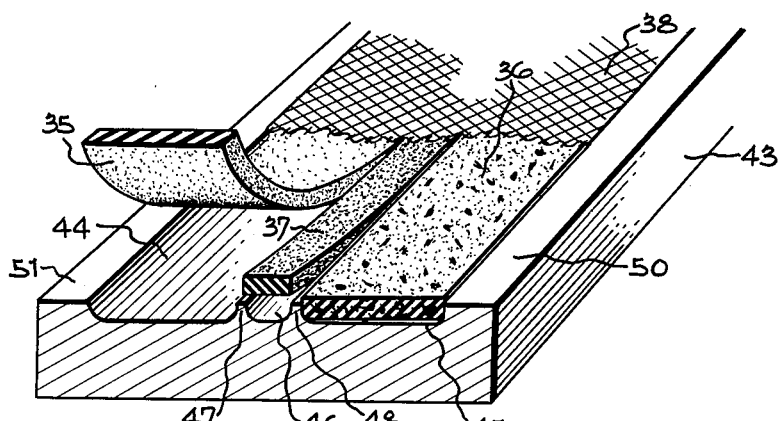
FIGURE 12 is a perspective view of the lower half of a mold section showing the manner in which component strips are inserted to form the composite strip shown in FIGURES 2 and 3.
Figure 13:
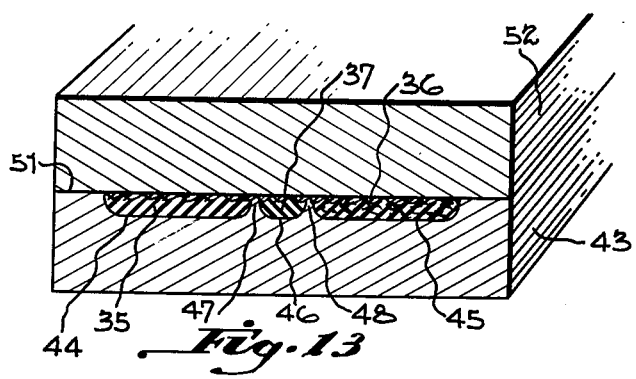
FIGURE 13 is a view similar to FIGURE 12 showing the top mold section in a closed position.
Figure 15:
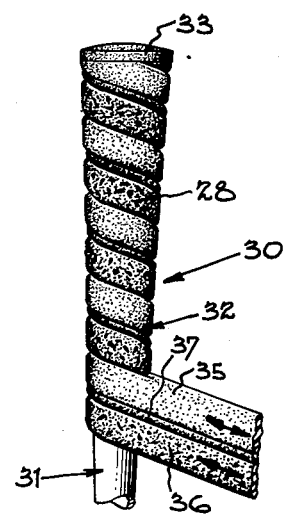
FIGURE 15 is an elevational view of an end of a golf club showing the manner in which a composite strip is wound in place.
Figure 14:
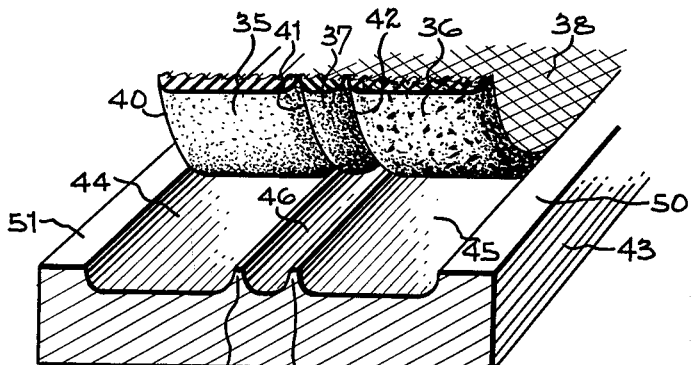
FIGURE 14 is a perspective view similar to FIGURE 12 showing the composite strip as it is removed from the mold.

As shown in FIGURE 1, one form of grip 10 constructed in accordance with the principles of the present invention is applied to the handle 11 of a golf club 12. Although, only the handle portion of the club is shown, it will be understood that the club includes an elongated tubular shaft 13 formed of metal, plastic or other suitable material and a head secured to the lower end of the shaft. The upper end of shaft 13 is prepared in any suitable way for receiving grip 10. For example the handle portion of the shaft may be fitted with a tapered rubber sleeve having a tightly wound spiral paper strip glued thereto, the outer surface of the strip being coated with a suitable adhesive compound for holding the grip in place.

Grip 10 is formed from an elongated composite strip 14 spirally wound about the handle of the club and held in place thereon by means of a suitable adhesive. Composite strip 14 includes two flat component strips 15 and 16 separated by two deep grooves or channels 17 and 18 and a substantially semicircular bead 20. A suitable fabric backing material 21 such as cotton duck cut on a bias is impregnated in the innermost surface of the strip. The manner of fabrication of strip 14 is explained in detail below. The uppermost end of strip 14 is cut diagonally as at 22 so that the upper end of the strip fits flush against a cap member 23 formed of hard rubber, plastic or the like, and secured to the end of the shaft in any suitable manner. This end of the strip is also preferably provided with a tab 24 formed of an arcuate segment of backing material 21 and adapted to be folded under the grip and stapled to the rubber sleeve (not shown) which covers the upper end of handle 11. The lowermost end of strip 14 is preferably beveled to fit under ferrule 25, which is glued to shaft 13 and is effective to hold the lower end of the grip in place.

The details of composite strip 14 are best shown in FIGURES 4 and 5. As there shown, two flat component strips 15 and 16 extend lengthwise of the composite strip on opposite sides of bead 20. The bead is separated from each of the strips by means of channels 17 and 18 which extend substantially from the outer surface 26 of the strip to the flat inner surface 27 carrying backing material 21. The flat strips may be of the same color as one another, as in the embodiment shown, or may be of different colors, but are preferably of a different color from the bead. The grip has a very neat appearance since the juncture of the colors between the strips and bead occurs adjacent to the bottom of grooves 17 and 18 thereby minimizing the effect of any running which may take place between the colors.

Each of the component strips and bead is originally formed as a separate element. One suitable formulation for a strip is as follows:

| | Lbs. | Oz. |
| --- | --- | --- |
| Smoked sheet rubber | 30 | |
| Stearic acid | | 5 |
| Zinc oxide | 2 | |
| Neophax | 3 | |
| (Harwick Standard Chemical Co.—A vulcanized vegetable oil in the form of a fluffy brown powder. Compounded with neoprene to aid in the processing and to impart smoothness and resistance to aging.) | | |
| Butyl rubber | 4 | 8 |
| (A product obtained from the copolymerization of isobutylene and isoprene.) | | |
| Piccopale resin | 4 | 8 |
| (Harwick Standard Chemical Company—A thermoplastic, methylated paraffinic hydrocabon resin of petroleum origin.) | | |
| Titanium dioxide | 1 | |
| Pliolite | 4 | |
| (Goodyear Rubber Co.—A series of butadiene-styrene copolymers or cyclized natural rubber resin.) | | |
| HSC-38 | 1 | |
| (Harwick Standard Chemical Company—An oil used as a plasticizer, dispersing and curing aid.) | | |
| Precipitated calcium carbonate | 20 | |
| Anti-oxidant #2246 | | 6 |
| (American Cyanimid—2,2′-methylenebis (4-methyl-6-tertbutyl-phenol.) | | |
| Agerite | 2 | |
| (R.T. Vanderbilt Co.—A rubber anti-oxidant, such as parabenzyloxyphenol, or di-beta-naphthyl-p-phenylenedimine.) | | |
| Coloring material | 5 | |
| Sulfur | 1 | 10 |
| (Coblend I. S. General Tire Rubber Co.) | | |
| Accelerator MBTS | | 7 |
| (Dupont—Benzothiazyl disulfide.) | | |
| Accelerator DOTG | | 2 |
| (Dupont—Di-ortho-tolylguanidine.) | | |
| Abitol | 1 | |
| (Hercules Powder Co.—A colorless, tacky, very viscous liquid; a mixture of tetra-, di-, and dehydroabietyl alcohol made from rosin.) | | |

After thorough intermixture these ingredients are passed through calendar rolls effective to sheet the material. These sheets are then cut into elongated strips. As explained in detail below, these unvulcanized component strips are later placed in a mold under heat and pressure which vulcanizes the strips into an integral composite strip. However, during vulcanization, the buty rubber does not vulcanize and this unvulcanized rubber coupled with the resin and other elements such as the higher alcohol, "Abitol," causes the grip to be tacky throughout.

FIGURE 2 shows a modified form of grip 28 which is applied to the handle 30 of golf club 31 in the same manner as grip 10 is applied to handle 11. Specifically, grip 28 is formed from a composite strip 32 wrapped tightly around handle 30 between cap 33 and ferrule 34, the grip being held in place by means of any suitable adhesive material applied directly to the shaft or to a layer of covering material such as the rubber sleeve and wrapped paper liner described above.

Composite strip 32 comprises two longitudinally extending component strips 35 and 36 separated by bead 37 and a cloth backing strip 38 covering the inner surfaces of the bead and component strips. Component strips 35 and 36 are generally flat but may be provided with slightly rounded outer edges 40 if desired. Bead 37 is generally semicircular in cross section and is spaced from strips 35 and 36 by grooves 41 and 42. Backing strip 38 is preferably in the form of a canvas duck cloth of a weight of the order of 7.10 ounces per square yard. The cloth is preferably cut on a bias to provide a limited amount of stretch. As explained below the rubber is vulcanized in contact with the backing strip so that the strip is firmly embedded in the inner surface of the composite strip. This backing strip is effective to impart strength and stability to the grip; and in addition, as explained below, provides a means for readily wrapping each grip uniformly from one end to the other.

In the embodiment shown, component strips 35 and 36 are formed of two different colors while bead 37 is formed of a third color. Moreover, while strip 35 and bead 37 are formed of a rubber compound of the type described above, component strip 36 is formed of a somewhat different material having fabric material such as cotton flock or ground tire casing threads mixed therein to provide a slightly rougher surface than strip 35. One suitable form of strip is made by thoroughly mixing equal quantities of the rubber stock described above and ground up tire stock.

The method of manufacturing the grip shown in FIGURES 2 and 3 can best be understood by reference to FIGURES 12–15. After component strips 35 and 36 and bead 37 have been sheeted and cut as described above, they are placed in a mold section 43 as shown in FIGURE 12. This mold section is configured to form longitudinally extending channels 44 and 45 for receiving strips 35 and 36. The mold section is also provided with a narrow channel 46 disposed between channels 44 and 45 for receiving bead forming strip 37. Narrow upstanding divided flanges 47 and 48 separate channels 44 and 45 from channel 46. These divider flanges preferably terminate a few thousandths of an inch below surfaces 50 and 51 adapted to abut the planar face of upper mold section 52. A cloth backing layer 38 is placed over the upper surface of strips 35, 36 and 37. Next, the mold sections are brought together under a pressure of the order of 1800 pounds per square inch and the rubber is heated to approximately 320° F. for ten minutes. This causes the three strips 35, 36 and 37 to vulcanize, forming a single composite strip 32. During this molding operation, backing material 38 is pressed into intimate contact with the rear surface of each of the component strips and bead and is firmly secured thereto. When the mold sections are closed divider flanges 47 and 48 contact fabric backing 38 and are effective to prevent any appreciable amount of material from running between strips 35, 36 and 37. In addition a narrow line of the fabric is slightly visible in the bottom of the grooves formed by the divider strips. This creates a "stitched" effect which adds to the attractiveness of the grip.

After composite strip 32 has been removed from the mold and cooled, one end of the strip is cut diagonally in a similar manner to the strip shown in FIGURE 5 and the tab on the end of the strip is turned under and stapled or otherwise secured to the upper end of handle 30. The shaft is then placed on a slowly rotating lathe and strip 32 is helically wound about the handle, the operator pulling in the direction of the arrows shown in FIGURE 15 to stretch the rubber an amount limited by the stretch of fabric backing 38. After the desired length of the strip 32 is wound on the handle, the lower edge of the strip is cut and beveled; after which ferrule 34 is slipped over the end of the strip and glued in place. It is to be understood that the grip of FIGURE 1 is constructed in exactly this same manner except that two homogeneous strips are employed in place of one homogeneous strip and one fabric impregnated strip.

The grip of FIGURE 2 is extremely advantageous in several respects. In the first place, in the finished grip the homogeneous rubber and the impregnated rubber strips form alternate bands along the grip. Consequently the grip is ideally suited for use under varying playing conditions or by people whose hands may tend to perspire during play. The rubber bands are adapted to provide an excellent gripping surface, during dry weather and for players with relatively dry hands, while the impregnated bands provide a good gripping surface in wet weather or for players whose hands perspire excessively. Consequently the present grip can be used effectively by any player in any type of weather he may encounter.

The frictional qualities of the grip are also enhanced by the constituents of the grip material which do not vulcanize under the molding conditions described. These latter constituents include the butyl rubber, resin and "Abitol." These materials give to the grip a permanent tackiness which does not wear off or wash off even after protracted periods of use. In this preferred form of grip the frictional "drag," or resistance provided by the grip to longitudinal movement of the player's hands, is substantially increased by the beads molded therein. The bead receiving groove 46 in die 43 is preferably deeper than grooves 44 and 45 which shape the component strips, consequently in the finished grip, bead 37 extends slightly outwardly from the other portions of the handle. The arcuate configuration of this bead and the deep channels formed on either side of it provide excellent gripping surface.

A modified form of composite strip 55 is shown in FIGURES 6 and 7. As there shown strip 55 is configurated in substantially the same manner as strips 14 and 32. That is strip 55 includes two flat, longitudinally extending endwise bands 56 and 57 separated by a bead 58, the bead being spaced from each of the bands by relatively deep channels 60. In forming the grip shown in FIGURE 6, a single unvulcanized strip, preferably of the same composition described above, is placed in a mold such as that shown in FIGURE 12 over a vulcanized beading strip 58. The mold is then closed and heat and pressure applied, so that the unvulcanized strip is vulcanized to form shaped bands 56 and 57 and is bonded to bead 58. Bead 58 is preferably of a color different from the unvulcanized strip so that a two color composite strip is formed, the line of demarcation of the colors extending along the bottom of channel 60. Consequently, any running not prevented by the divider flanges of the mold is substantially hidden by the channel configuration of the strip. After it has been removed from the mold and cooled, strip 55 is wound about a golf club handle in the manner described above.

FIGURES 8 and 9 disclose a still further modification of the golf club grip of this invention. As there shown, a composite strip 61 is formed from two component strips 62 and 63. These component strips are preferably of the same composition given above and are of two different colors. These strips are placed in an unvulcanized condition in a mold including two longitudinally extending channels for receiving the strips and a divider flange separating the channels. The flange extends a distance greater than half the thickness, and preferably only slightly less than total thickness, of the strips to form a deep groove 64 separating the two component strips 62 and 63. As described previously this channel minimizes the tendency of color to run from one strip to the other and also minimizes the visual effects of any running that does occur so that the overall appearance of the strip is that of two bands meeting in a straight line. When finished, composite strip 61 is applied to a golf club handle as described above.

A still further form of component strip is shown in FIGURES 10 and 11. This particular form of strip is particularly adaptable for forming four color strips. The composite strip 65 comprises a first component strip 66 formed of one color, a bead 67 of a second color spaced from strip 66 by channel 68, a second strip 70 of a third color spaced from bead 67 by channel 71, and a second bead 72 of a fourth color extending along the edge of the composite strip and spaced from component strip 70 by channel 73. The strip of FIGURE 10 is formed by placing four unvulcanized strips of material in a mold having four adjacent channels separated by divider flanges of the type described above. The material is then vulcanized by applying temperature and pressure in the manner described above, to form a unitary composite strip which is later wound about a golf club handle.

From the foregoing description of the general principles of this invention and the above disclosure of several preferred embodiments, those skilled in the art will readily comprehend the various modifications to which the invention is susceptible. Thus while the present grip is particularly well suited for use on golf clubs, it is contemplated that it can also be used advantageously on other sports equipment such as tennis rackets, baseball bats, and the like. Furthermore, it will be appreciated that other compositions than the specific ones set forth above can be employed. Thus two color grips can be formed in accordace with the present method by molding colored synthetic rubber strips or even plastic materials in the manner described. It is to be expressly understood that in the following claims the term rubber like composition includes not only compositions described in detail in this application but synthetic rubbers and plastics as well.

Having described our invention, we claim:

1. In a method of forming two color golf club grips, the steps of placing two unvulcanized component strips of elastomeric composition in a mold, said strips being of two different colors, and subjecting said strips to heat and pressure to vulcanize the same forming a single composite strip, and simultaneously forming a groove in said composite strip along the line joining said component strips.

2. In a method of forming two color golf club grips, the steps of placing a plurality of unvulcanized component strips of elastomeric composition in a mold, said strips being of different colors, placing a cloth backing strip over said component strips, and subjecting said strips to heat and pressure to vulcanize the same forming a single composite strip, and simultaneously forming a groove in said composite strip intermediate each of the said component strips, said groove extending through said composite strip substantially to said cloth backing strip.

3. A method of forming two color golf club grips the steps of placing a plurality of unvulcanized component strips of elastomeric composition in a mold, said strips being of different colors, placing a bias cut cloth backing strip over said component strips, and subjecting said strips to heat and pressure to vulcanize the same forming a single composite strip, simultaneously forming a groove in said composite strip intermediate each of the said component strips, said groove extending through said composite strip substantially to said cloth backing strip, and thereafter helically winding said composite strip about the handle of the golf club by rotating said golf club handle and stretching said composite strip an amount limited by the resiliency of said backing strip.

4. In a method of forming two color golf club grips the steps of placing a narrow bead strip of elastomeric composition in a mold, placing two unvulcanized component strips wider than said bead in the mold on opposite sides of said bead strip, said component strips being of a different color from said bead, subjecting said strips to heat and pressure to vulcanize the same to form a single composite strip, and simultaneously forming a groove in said composite strip between said bead and each of said component strips.

5. In a method of forming two color golf club grips, the steps of placing a bead strip in a mold, placing a flat strip of elastomeric material of substantially greater width than said bead in the mold over said bead so that the flat strip extends on either side of the bead, said strip being of a different color from the bead, subjecting said strips to heat and pressure to vulcanize the same to form a single composite strip, and simultaneously forming a groove in said composite strip on either side of the bead.

6. In a method of forming two color golf club grips, the steps of placing a narrow bead strip of elastomeric composition in a mold, placing two unvulcanized component strips wider than said bead in the mold on opposite sides of said bead strip, said component strips being of a different color from said bead, placing a fabric backing strip over said component strips and bead subjecting said strips to heat and pressure to vulcanize the same to form a single composite strip, and simultaneously forming a groove in said composite strip between said bead and each of said component strips, said grooves extending through said composite strip substantially to said fabric backing strip.

7. In a method of forming gold club grips, the steps of placing a narrow bead strip of elastomeric composition in a mold, placing two unvulcanized component strips wider than said bead in the mold on opposite sides of said bead strip, one of said component strips being formed of a substantially homogeneous material, the other of said strips having a fabric material incorporated therein, subjecting said strips to heat and pressure to vulcanize the same to form a single composite strip, simultaneously forming a groove in said composite strip between said bead and each of said component strips.

References Cited in the file of this patent

UNITED STATES PATENTS

| | | |
|---|---|---|
| 1,441,986 | Lard | Jan. 9, 1923 |
| 1,603,812 | Stein | Oct. 19, 1926 |
| 1,958,131 | Davidson | May 8, 1934 |
| 1,968,064 | Young | July 31, 1934 |
| 2,000,295 | Oldham | May 7, 1935 |
| 2,651,079 | Michaelson et al. | Sept. 8, 1953 |
| 2,658,044 | Anderson | Nov. 3, 1953 |
| 2,671,660 | Goodwin | Mar. 9, 1954 |
| 2,789,616 | Cuthbertson et al. | Apr. 23, 1957 |
| 2,836,420 | Lamkin et al. | May 27, 1958 |
| 2,859,795 | Greig | Nov. 11, 1958 |

FOREIGN PATENTS

| | | |
|---|---|---|
| 21,370 | Great Britain | 1911 |
| 344,375 | Great Britain | 1931 |
| 706,109 | Great Britain | Mar. 24, 1954 |